United States Patent [19]

Kaplinsky et al.

[11] Patent Number: 4,782,462

[45] Date of Patent: Nov. 1, 1988

[54] RASTER SCAN VIDEO CONTROLLER WITH PROGRAMMABLE PRIORITIZED SHARING OF DISPLAY MEMORY BETWEEN UPDATE AND DISPLAY PROCESSES AND PROGRAMMABLE MEMORY ACCESS TERMINATION

[75] Inventors: Cecil H. Kaplinsky, Palo Alto; Jan-Kwei J. Li, San Jose, both of Calif.

[73] Assignee: Signetics Corporation, Sunnyvale, Calif.

[21] Appl. No.: 815,363

[22] Filed: Dec. 30, 1985

[51] Int. Cl.[4] .................... G06F 9/46

[52] U.S. Cl. .................... 364/900; 340/799; 364/521

[58] Field of Search ........ 364/526, 521, 200 MS File, 364/900 MS File; 340/707, 777, 800, 799, 717

[56] References Cited

U.S. PATENT DOCUMENTS

| | | | |
|---|---|---|---|
| 3,676,861 | 7/1972 | Ruth | 364/200 |
| 4,096,572 | 6/1978 | Namimoto | 364/200 |
| 4,151,592 | 4/1979 | Suzuki et al. | 364/200 |
| 4,209,832 | 6/1980 | Gilham et al. | 364/521 |
| 4,400,771 | 8/1983 | Suzuki et al. | 364/200 |
| 4,484,302 | 11/1984 | Cason et al. | 364/521 |
| 4,542,376 | 9/1985 | Bass et al. | 364/521 |
| 4,704,697 | 11/1987 | Kiremidjian et al. | 364/521 |

*Primary Examiner*—Raulfe B. Zache
*Assistant Examiner*—Eric Coleman
*Attorney, Agent, or Firm*—James J. Cannon

[57] ABSTRACT

In a bit-mapped display system, a logical subsystem for programmable sharing of access to a memory in a computer system among a plurality of system resources wherein various modes of operation are supported by the logic and are programmably selected by the user. The use of display memory is controlled between updating and display accesses to prevent breakup of the video image while said image is being changed.

5 Claims, 9 Drawing Sheets

RASTER SCAN VIDEO CONTROLLER WITH PROGRAMMABLE PRIORITIZED SHARING OF DISPLAY MEMORY BETWEEN UPDATE AND DISPLAY PROCESSES AND PROGRAMMABLE MEMORY ACCESS TERMINATION

CROSS-REFERENCE TO RELATED APPLICATIONS

This application is related to the following pending applications: "HARDWARE WINDOWING SUPPORT IN A BIT MAPPED RASTER SCAN VIDEO CONTROLLER" Craig MacKenna and Jan-Kwei Li, inventors, Ser. No. 793,521, filed Oct. 31, 1985 (now abandoned); "DISPLAY ACCUMULATOR FOR HARDWARE WINDOWING RASTER SCAN VIDEO CONTROLLER" Craig MacKenna, Jan-Kwei Li and Cecil H. Kaplinsky, inventors, Ser. No. 793,526, filed Oct. 31, 1985(now abandoned); "UPDATE CACHE FOR A RASTER SCAN VIDEO CONTROLLER", Craig MacKenna and Jan-Kwei Li, inventors, Ser. No. 815,631, filed Dec. 30, 1985; ABSTRACT OPERATION SIGNALLING FROM A RASTER SCAN VIDEO CONTROLLER TO A DISPLAY MEMORY, Cecil H. Kaplinsky and Jan-Kwei Li, inventors, Ser. No. 815,362, filed Dec. 30, 1985; All these applications are assigned to the same assignee, and are incorporated herein by reference.

BACKGROUND OF THE INVENTION

1. Field of the Invention

This invention pertains to the field of bit-mapped alphanumeric and graphic processors, or bit-mapped raster scan video controllers, and in particular to the logic and circuit necessary to implement a variety of strategies for sharing access to display memory among a number of processes under the programmable control of the raster scan video controller. The invention is useful for high and low performance CRT systems, black/white or color, especially those capable of accessing display memory as needed to create and update an image on a video display.

2. Description of the Prior Art

Most presently available video display systems typically include a processor, a video controller, a display memory containing a single current screen image, other system memory, and a raster scan video display. In normal (steady-state) operation, the video controller continually reads out the contents of the display memory and transforms the information read out to the signalling necessary to control the raster scan beam while it is in its active display time. The video controller also provides the horizontal and vertical retrace signalling at appropriate intervals, and blanking of the raster scan beam during retrace.

The processor also has access to the display memory, so that it can change the current screen image. This access may be "through" the video controller or "around" it. The subject invention applies to the former type of system. In either case, use of the display memory is typically carefully controlled between updating and display accesses, to prevent breakup of the video image while it is being changed.

In bit mapped display systems, display memory must be accessed by or shared among (1) the display process that keeps the image on the CRT and one or both of: (2) a dedicated hardware engine that updates or changes the image; and/or (3) a microprocessor that updates or changes the image. Existent CRT controllers typically adopt a fixed strategy for the sharing—either alternating accesses between (1) and (2) and/or (3), and/or allowing 2 and/or 3 access during retrace or blanking times. In most prior art systems, the allocation of display memory accesses between the display process and updating is external to the video controller. The two types of accesses are kept physically separate by logical circuits such that the allocation is fixed and not subject to change.

Depending on the timing of the various parts of the system, the display memory may be available for updating a) only during vertical retrace periods, or b) during horizontal and vertical retrace periods, or c) during retrace periods plus alternating memory cycles during the active display time of scan lines. In any of these cases, however, updating of display memory typically proceeds at a rate slower than could be achieved without interference from the video controller's display accesses.

The invention is a mechanism by which a raster scan video controller can be programmed for any of a variety of sharing strategies, in accordance with application requirements.

Another object of the present invention is to improve performance of a raster scan display system because the update and video operations can occur simultaneously in many cases.

SUMMARY OF THE INVENTION

A raster scan video controller incorporating the present invention has an address module and preferably at least one data module. It is designed to work with an external processor which generates the instructions for the chip set. The major function of the address module is to generate both video addresses and update addresses, while the data modules are used to collect and integrate video data that had been read out from the display memory. The data output from the data module passes through high speed shift registers and a look-up table to the raster scan display. The major parts of the address module are a synchronous signal generator, a window controller, an update controller and an interface controller. The address module also has the ability to update the contents of the display memory according to instructions passed from the host system. Thus, the host system does not have to access display memory when it wants to insert some characters or graphic elements into display memory. It only passes the appropriate instructions and/or data to the controller.

In the bit-mapped display system of the present invention, the window controller and the update controller each have their own control logic which perform some internal and external accesses to the display memory and other subsystems. In fact, they operate as independent processors sharing resources with each other. At the same time, the host processor may compete for the same resources. The present invention pertains to a logical subsystem which allocates the shared resources among these units. Since the display system operates in real time, the distribution of time is a critical factor.

In order to optimize the resource sharing scheme, the resources are divided into six groups. The resources are the internal registers of the window controller, an 18-bit adder, a display address port, a data port, a local address port and the system bus.

The display process, update engine, and host processor are first assigned a gross overall priority by programming two control register bits. Actually, the update engine and the display process contend not only for display memory but for several parts of the raster scan video controller. These resources are requested by the display process (window controller) on several RR (resource request) lines and are granted by the update control unit on corresponding RG (resource grant) lines.

The principal novelty of the invention is in the programmable logic by which the display process releases the resource request lines and the logic by which the update controller asserts the resource grant lines. Three modes of operation are supported by the hardware and can be programmably selected by the user. The modes are selected according to the setting of two priority bits and a signal indicating that a data display buffer is full. In the first mode, the display process has priority and the resource request counter does not run. Only the XEND signal after each scan line makes the display process release its request and give control to the update process. Thus display memory is dedicated to the display process during scan lines, as in many existent devices.

In the second mode, the display process and update accesses are interleaved as in some existent devices, but with a programmable percentage to each. A programmable four-bit register controls how long the display process keeps control before releasing its request, while a similar register controls how long the update process keeps control before granting control to the display process.

In the third mode of operation, the display process again has priority and its counter does not run. Instead, the request is released when the FIFO buffer of the data module is full. The data module is disclosed in the copending, cross-referenced application entitled DISPLAY ACCUMULATOR FOR HARDWARE WINDOWING RASTER SCAN VIDEO,,CONTROLLER, Ser. No. 793,526, filed Oct. 31 1985 (now abondoned). The update access counter operates as before, except that FIFO FULL must be false before a grant will be made. After the update controller gets control of display memory it will keep it for a programmed period, and release them when the RR signals become active and the FIFO is not Thus, the invention provides a programmable way to divide accesses to display memory among a window controller, an update controller and a microprocessor, as well as the display refresh process.

DESCRIPTION OF THE PREFERRED EMBODIMENT

Figure 1:
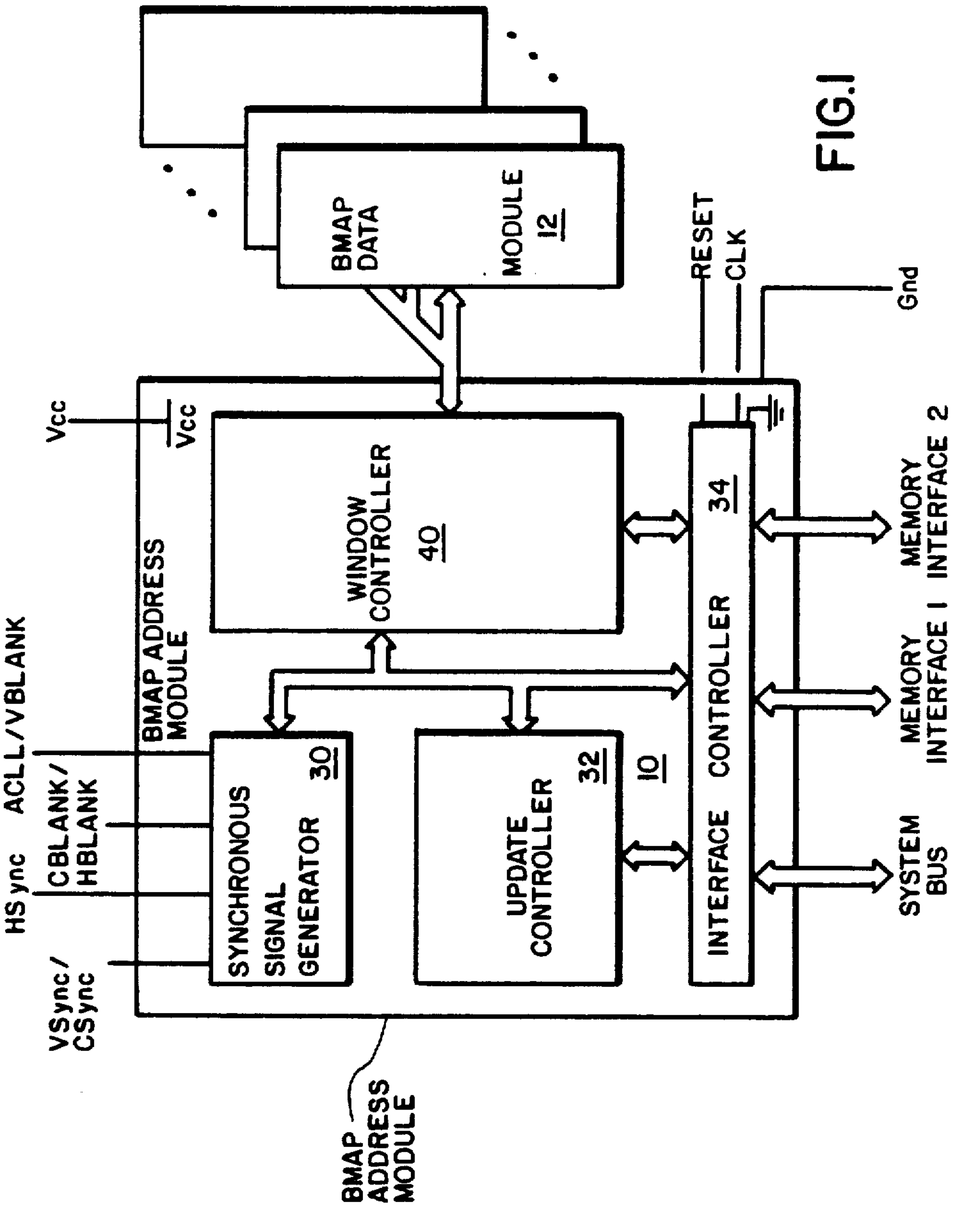
FIG. 1 is a block diagram of a bit-mapped alphanumeric and graphic display controller with which the present invention can be used.

A bit-mapped raster scan video (CRT) controller chip is illustrated in FIG. 1, It has an address module 10 and a data module 12. This chip set provides hardware support for windows in a bit-mapped alphanumeric and graphic raster scan video (CRT) display system used in a computer system having one or more main processors and is particularly advantageous for use with multi-tasking operating systems. The hardware support includes logical circuits whereby a description of overlapping windows can be programmed into the chip set. This feature allows the CPU to maintain a multi-window bit-mapped display almost as easily as it maintains a conventional alphanumeric display.

The cross-referenced applications, which are incorporated herein by reference, disclose the address module and the data module in substantial detail.

In this specification the term "video access" is used to indicate an access that reads out the display memory contents to be displayed on the screen. The term "update access", on the other hand, indicates a memory access that is used to update the contents of the display memory. The term "update operation" refers to the transfer of information between the updating device and the registered transceivers of FIG. 3. In the embodiment used to illustrate the present invention, each video access and update access consists of 16 to 256 bits, while an update operation always consists of a 16-bit word.

FIG. 1 of the cross-referenced application Ser. No. 793,521 shows the relations between video accesses and update accesses. After the display memory address is presented, the display memory will output the whole block of information corresponding to the display memory address. Then, preferably the data read out will go to data accumulator modules 12 or to the shift registers 15 directly, as described therein.

During an update operation that does not access data already present in the registered transceivers 14, the BMAP outputs a "local address" together with the display memory address to select a 16-bit word from the display memory 13. The local address is used to select the desired word from the update access. All 4 bits in the local address are needed when the BMAP is used in a system that has 8 bits per pixel and 32 pixels per video access.

Figure 2:
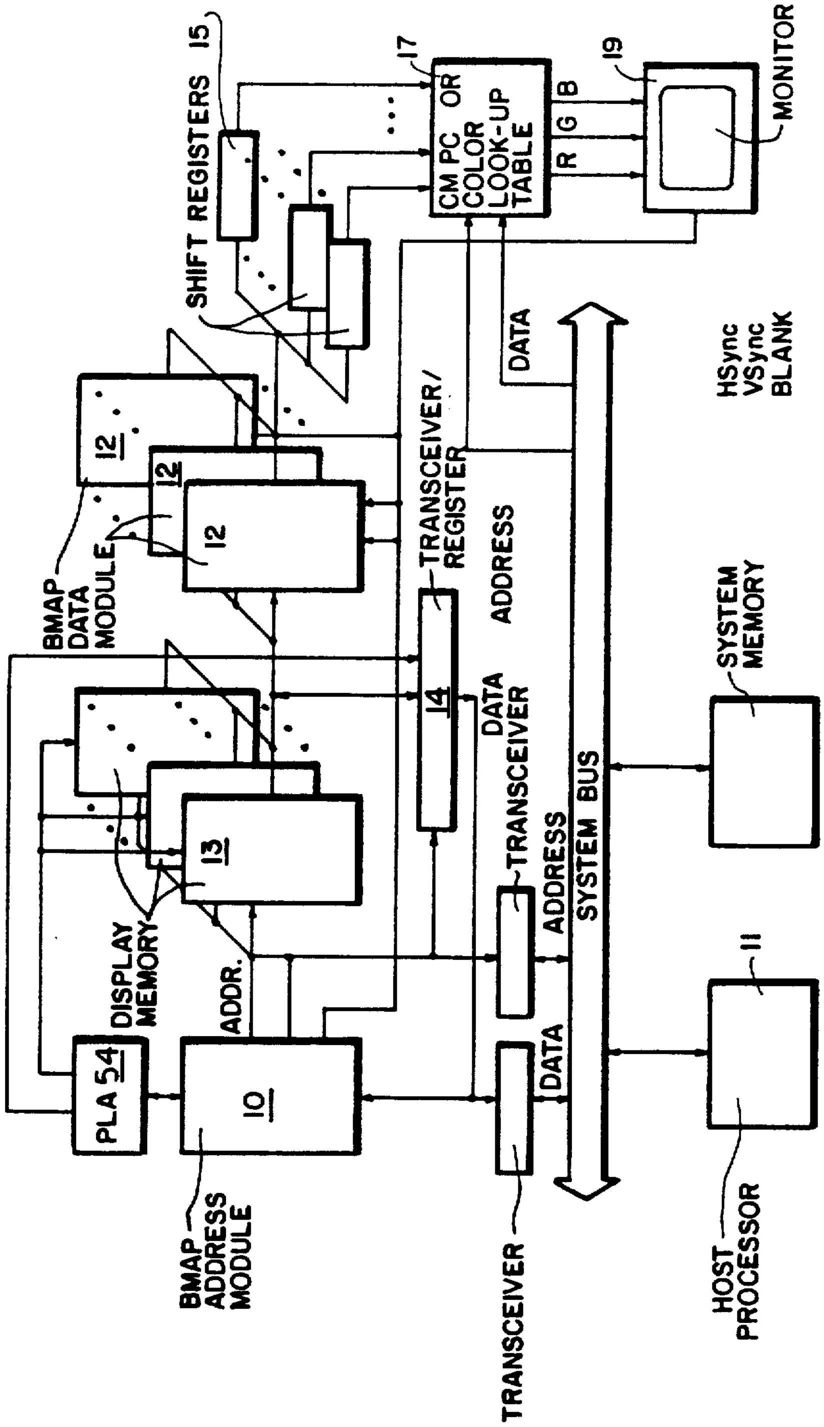
FIG. 2 is a block diagram of a sophisticated display system using the controller of FIG. 1 and the present invention.

FIG. 2 of the cross-referenced application Ser. No. 793,521 shows the relations between the display address, update address, and the pixel address. The 18 most significant bits in the pixel address represent the 18 bit display memory address.

Since a 16-bit word may consist of 16 pixels for a monochrome display system, and consist of 2 pixels for a system that has 8 bits per pixel, the pixel offset can vary from 1 to 4 bit positions. Table 1 of the cross-referenced application Ser. No. 793,521 shows the number of bits in the local address and the pixel offset for different systems.

Address Module and Data Module

FIG. 1 is a block diagram of the improved video controller incorporating the present invention. It has an address module 10 and preferably at least one data module 12. The controller is designed to work with an external processor which generates the instructions for the set. The major parts of the address module are a synchronous signal generator 30, a window controller 40, an update controller 32 and an interface controller 34. This application is directed primarily to the interface controller 34 of the address module. The cross-referenced application Ser. No. 793,526 is directed to the data module 12, while the cross-referenced application Ser. No. 793,521 is directed to the window-controller 40 of the address module 10.

FIG. 2 is a block diagram of a sophisticated system that includes an address module 10 and several data modules 12. The major function of the address module 10 is to generate both video addresses and update addresses, while the data modules 12 are used to collect and integrate the display patterns that have been read out from the display memory 13. The data output by the data module(s) 12 then goes through the high speed shift register(s) 15 and color look-up table 17 to the video display 19.

The address module 10 also has the ability to update the contents of the display memory 13 according to the instructions passed from the host system. Therefore, the host processor 11 does not have to access the display memory 13 when it wants to insert some characters or graphic elements into the display memory. Instead, it only needs to pass appropriate instructions to the address module 10.

After receiving the instructions passed from the host system, the address module executes them one by one as a special purpose microprocessor. Since the whole procedure is controlled by the internal hardware, instructions can be done within a very short time. Typically the insertion speed is 5 to 50 times faster than a software procedure on the host processor.

To do a block transfer, the host processor can also use the address module 10 in the DMA/BitBlt mode. The DMA/BitBlt procedure is similar to the character insertion procedure.

The data module 12 has 32 data inputs and 8 data outputs. By setting the appropriate control inputs, one or more data modules can be used in various kinds of applications. All systems that apply sequential memory access to increase the data read out speed, have to include the data module (or equivalent hardware) in the back-end.

Figure 3:
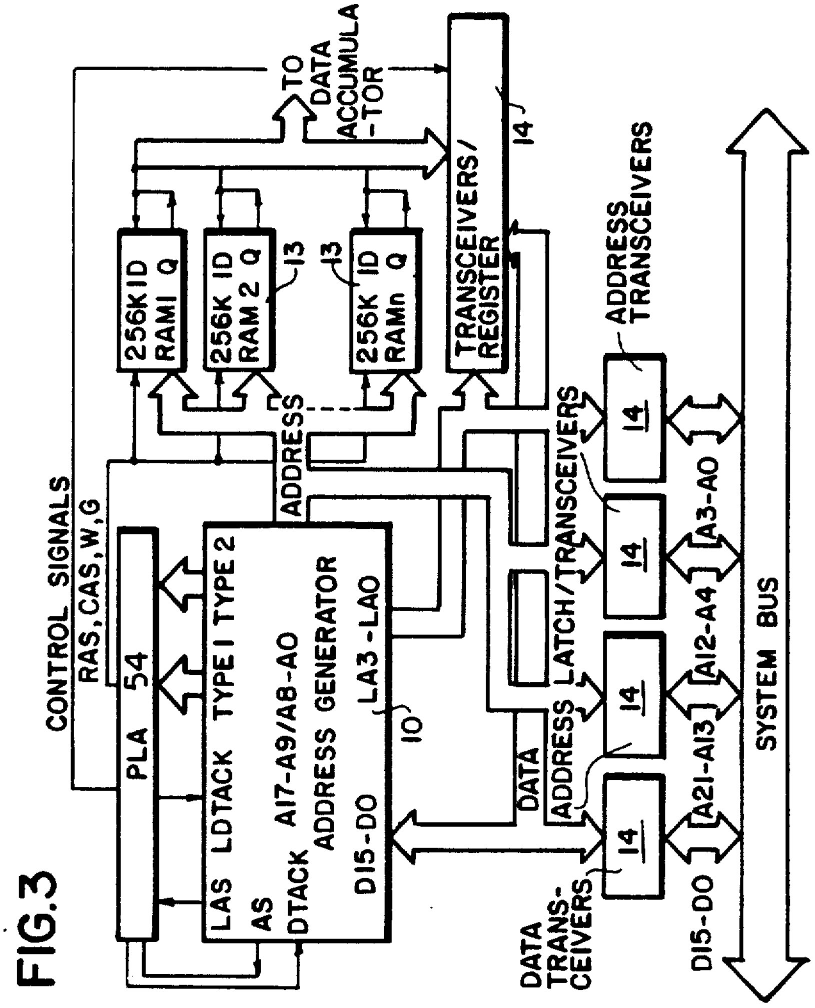
FIG. 3 is a block diagram of the structure of a display memory system used with the present invention.

The structure of the display memory 13 is related to the operating frequency of the raster scan video controller and the complexity of the system. FIG. 3 shows a typical memory structure that can be used with the BMAP chip set.

Interface Controller

Figure 4:
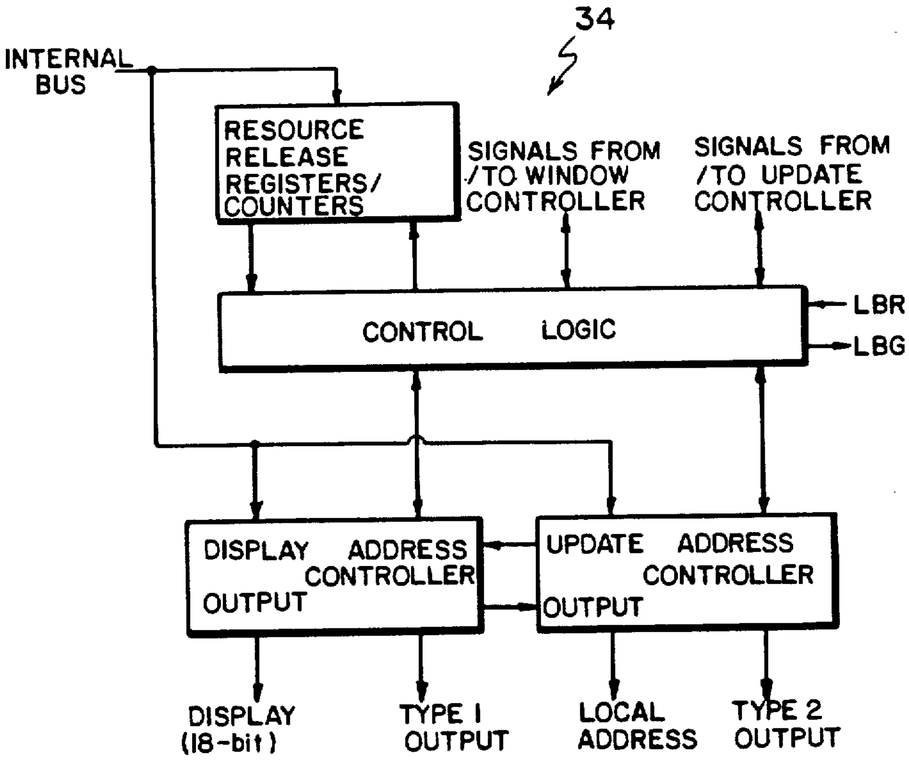
FIG. 4 is a block diagram of the interface controller used with the present invention.

The cross-referenced applications disclose that both the window controller 40 and the update controller 32 (FIG. 5) have their own control units which do internal and external accesses. Actually, they are like two processors sharing the resources with each other. The host processor may also join the resource competition. The interface controller is illustrated in FIG. 4.

Therefore, an allocation/arbitration scheme is needed to distribute the shared resources among these units. Because the BMAP has to work under a real-time environment, the distribution of time is a critical factor.

Distribution Logic

The logic described in this section is used to distribute six sets of resources among the window controller 40, update controller 32, and host processor 11. The display process, the update engine and the host processor are first assigned a gross overall priority. The bit assignments are indicated in Table 1 and are programmed into a register described later. The window controller 40 has to output the display memory address as needed to maintain a flicker-free display. Unless the update or external request priority bits are set to 1, the window controller 40 always has the highest priority to access all the resources.

However, when the update controller 32 is in the idle mode, the priority of the its update access should be temporarily set to the lowest level. This arrangement allows the external host processor 11 to have a chance to access the display memory 13. Table 1 shows the relations between the device priority and the priority bits. The resources and the control logic are described below.

TABLE 1

| Device Priority and Priority Bits | | |
|---|---|---|
| External Priority | Update Priority | Priority High . . . Low |
| 1 | 1 | Video Access- External Request- Update Access |
| 1 | 0 | Update Access- Video Access- External Request |
| 0 | 1 | External Request- Video Access- Update Access |
| 0 | 0 | External Request- Update Access- Video Access |

In order to optimize the resource sharing scheme, the resources are divided into six groups. Table 2 shows the control units and their need for resources. The resources, which are described and illustrated in the cross-referenced application Ser. Nos. 793,521 and 793,526, both filed Oct. 31, 1985 are:

1. Internal registers of the window controller.
2. 18-bit RAM and adder
3. 18-bit address port.
4. Data port.
5. 4-bit address port.
6. System bus.

Obviously the first two are on-chip resources and the last one is an external resource, while #3, #4 and #5 have both internal and external implications.

TABLE 2

| Control Units and Their Needs for Resources | | |
|---|---|---|
| Control Unit | Types of Operations | Resources Needed |
| Window Controller | Video Access Grant | 1, 2, 3 |
| | DRAM Refresh Access | 1, 2, 3 |
| | Horizontal Resync | 1, 2 |
| | Vertical Resync | 1, 2, 3, 4, 5 |
| Update Controller | Character Insertion | [2], [3], 4, 5, 6 |
| | Instruction Fetch | 3, 4, 5, [6] |
| | R/W Internal Register | 1, 2, 4 |
| Host Processor | Display Memory Bus Grant | 3, 4, 5, 6 |

[X]: Depends on Type of Cycle.

The reading for including the system bus as a resource to be distributed is that the update controller 32 may share the system memory with the host processor in some applications. In this situation, the update controller has to get the system bus before it goes to compete for the on-chip resources. This is because the BMAP is quasi-synchronous, while typically the system bus is asynchronous.

There is one local/system select bit which corresponds to each of the source address counter, destination addres counter, and program counter. If one of the counters is used to access display memory and the corresponding bit is 0, the BMAP requests the system bus before it outputs the memory address. This arrangement also doubles the memory space for the update controller.

Control Logic

Figure 5:
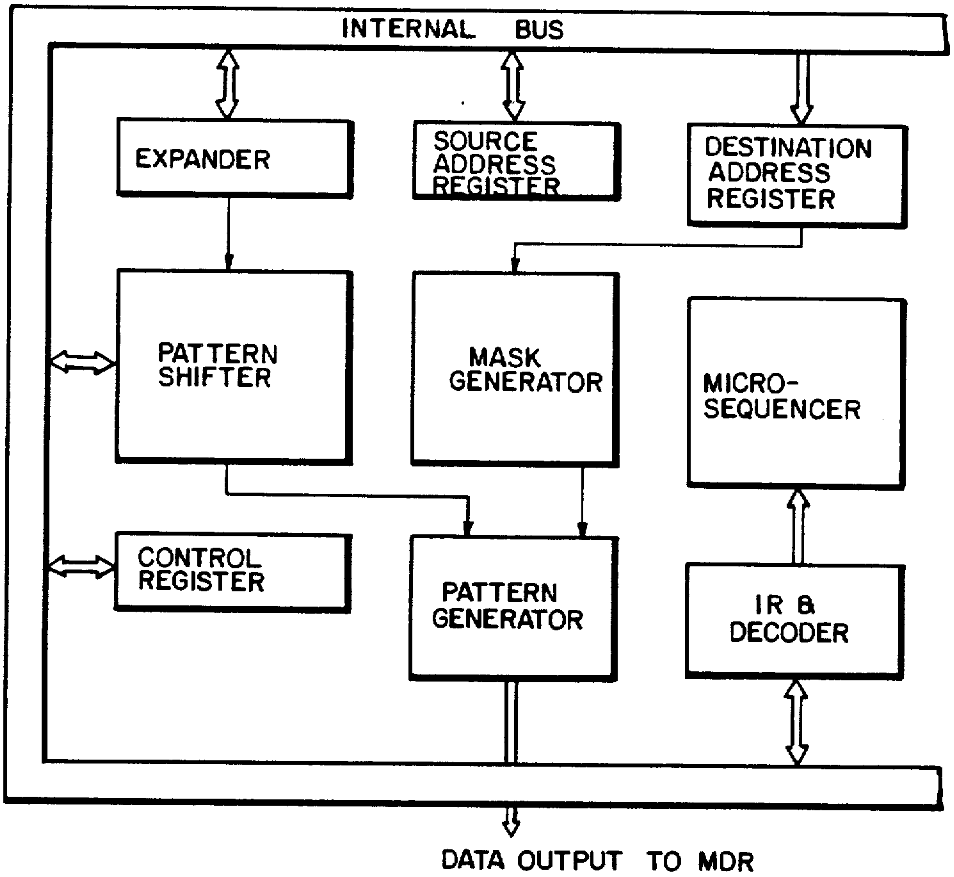
FIG. 5 is a block diagram of the update controller used with the present invention.
Figure 6:
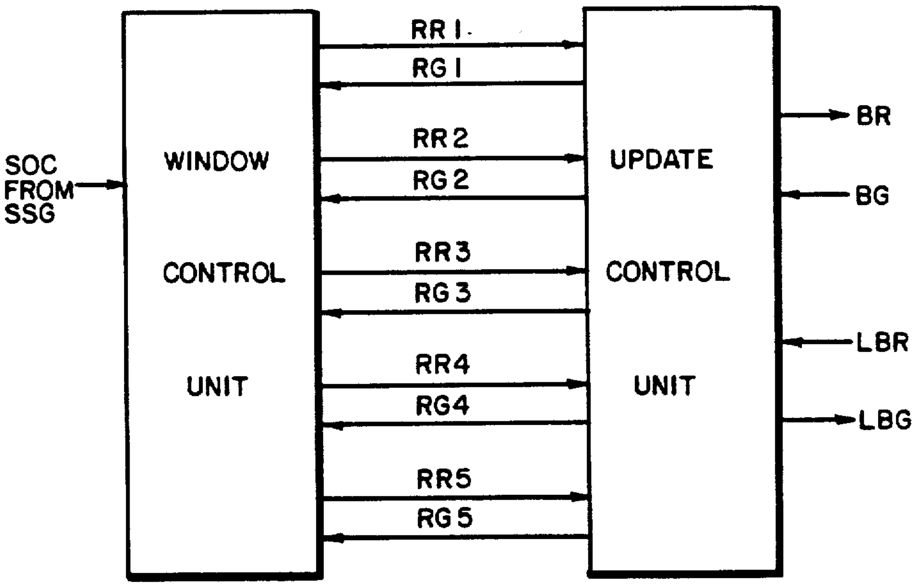
FIG. 6 is a block diagram showing the control signals of the present invention.

The distribution control signals are shown in FIG. 6. The RR1–RR5 (resource request) signals are used by the window controller 40 to request the resources from the update controller 32. FIG. 5 is a block diagram of the update controller. If the update controller or the external device does not have the higher priority, the update controller should release the resources and assert the RG (resource grant) signals once the program access cycles are completed, if the window controller has asserted the resource request signals.

Basically, the BMAP supports three modes of operation, which can be selected by the user. The modes are selected by the setting of two status bits in the BMAP and the FIFO full input signal.

The first programmable option allows the window controller to continuously hold all the resources it needs until the XEND signal is asserted. (This signal is described in the cross-referenced application Ser. No. 793,521.) This control logic is activated by setting the status bits to 00 and connecting the FIFO full signal to ground (false). This mode guarantees that no time is lost in distributing the resources during the display period. Therefore, it is suitable for a fully synchronous design with narrow memory/display bandwidth.

The second programmable mode allows video accesses to be interleaved with update accesses. This mode is activated by setting the status bits to 01 and connecting the FIFO full signal to ground. During each time slot that the window controller has control of the resources, neither the update controller nor the external processor can use them. This option increases the update access rate, but may lose the ability to do sequential memory accesses. Since the interleaving period for video accesses and update accesses are programmable and pre-determined, no time is wasted during the display period for arbitration. Therefore, this mode is suitable for fully synchronous design with wider bandwidth.

The third programmable option is similar to the first option. It allows the window controller to fill the backend FIFO (inside the data module 12) with continuous sequential accesses. After the FIFO is filled, the window controller 40 releases the resources, such that the update controller 32 can use the resources while the data module 12 is sending out the FIFO contents. (The FIFO and the data module are disclosed in cross-referenced application Ser. No. 793,526.)

After the update controller 32 gets the resources, it keeps them for a programmed period, then releases them when the RR signals become active and the FIFO is not full.

Figure 7:
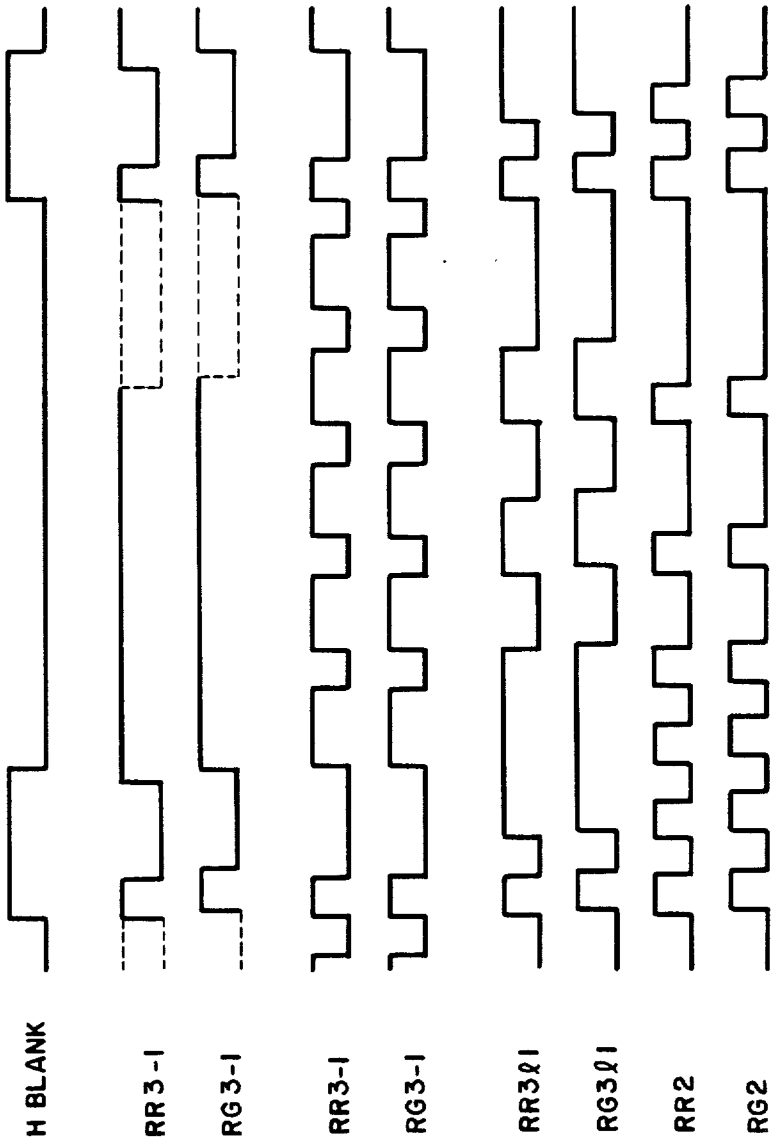
FIG. 7 is a timing diagram for the control signals of the present invention.

However, there is one difference between the third option and the previous options. The release control only restricts the 18-bit address port and the window controller registers so that they are no released too soon. The other resources, the 18-bit RAM and adder, can be released freely. This scheme can optimize the usage of the 18-bit RAM and adder. FIG. 7 shows the timing relationships between the RR, RG, and HBLANK signals for all the options.

Figure 8:
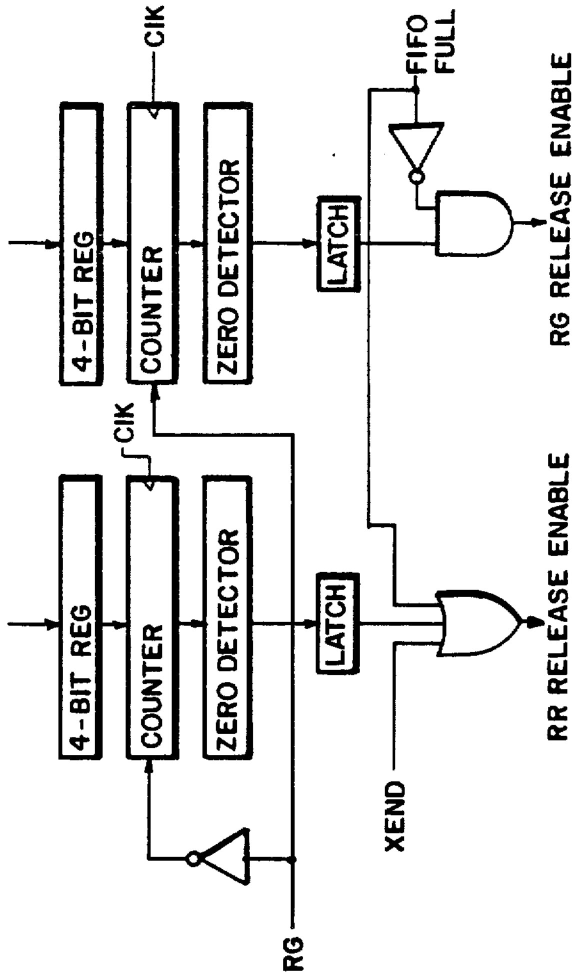
FIG. 8 is a block diagram of the resource release control logic of the present invention.

The structure of the programmable registers/counters which is used to do the resource release control is shown in FIG. 8.

The LBR* signal shown in FIG. 6 is used by the host processor 11 to request the local bus. The host processor asserts the LBR* input whenever it wants to access the display memory. In response to the LBR* signal, the update controller 32 asserts the LBG* output as soon as it gets control of the address ports and data port, and puts them in high impedance state.

The host processor negates the LBR* signal as soon as its display memory access is completed. The controller negates the LBG* output after the LBR* is negated.

Figure 9:
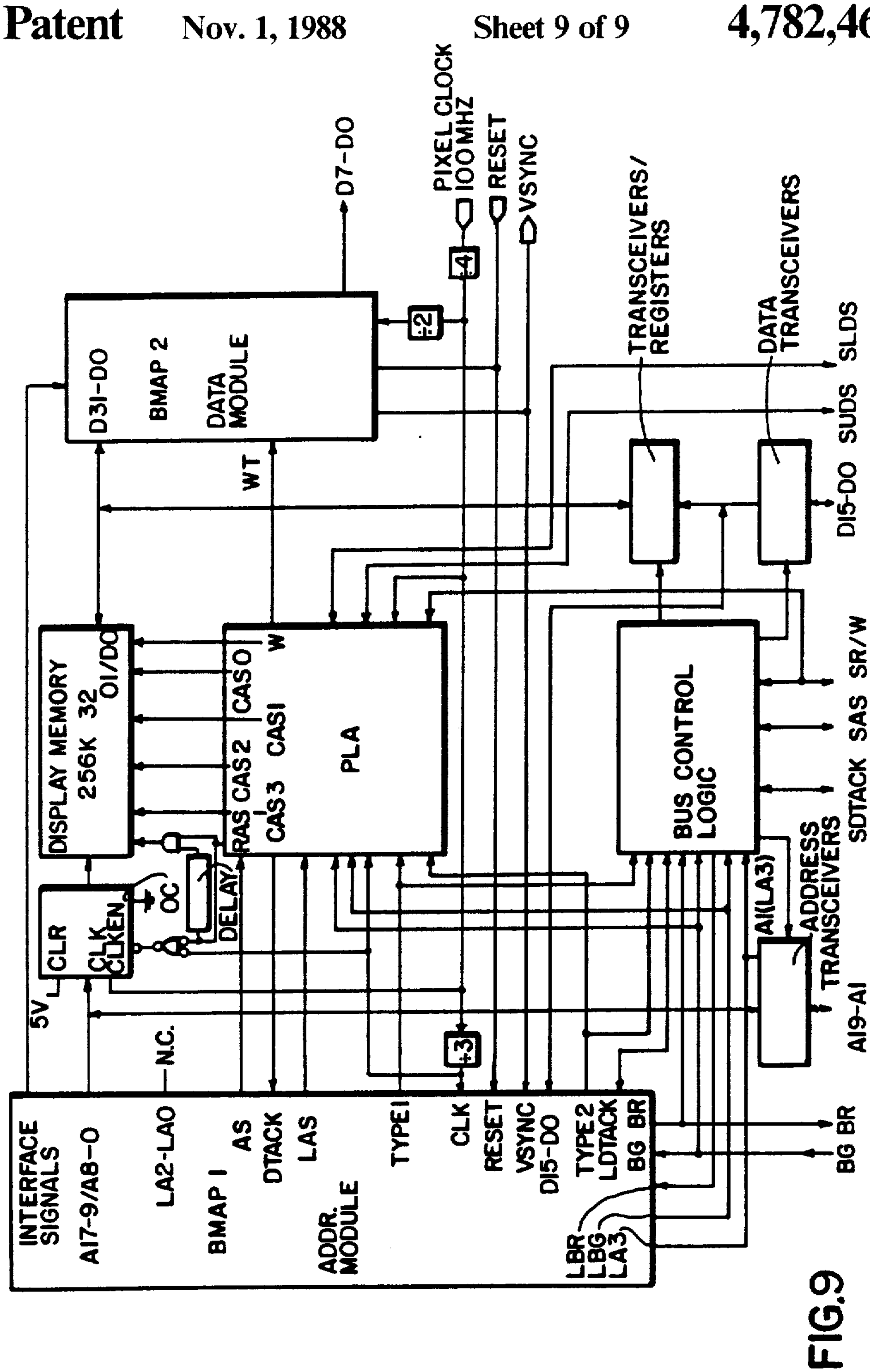
FIG. 9. is a block diagram of an exemplary system utilizing the present invention.

FIG. 9 is a detailed block diagram of an exemplary system showing the interconnection of the logical subsystems and the signals generated by each.

The programmable sharing of display access as described and illustrated herein enables a system designer to customize a controller chip set for a variety of differing system requirements from a low end system to a high end system. It enables a more precise matching of resources to requirements. The bus granting scheme and the interleaving of accesses provide a simple, user programmable system that requires less on-chip logic than a classical memory arbitration scheme.

We claim:

1. A circuit for programmed sharing of a plurality of system resources for use in processing operations in a computer system, said resources to be shared between update and display processes in a raster scan video controller, comprising:

A display memory having one or more signal terminals on which data is read or written;

two or more processing devices, each having a number of signal terminals on which they read or write data;

a raster scan video display;

first means which reads out selected contents of said display memory and transforms said contents to signals which control a raster scanning beam of the video display during an active display time;

second means which provides horizontal and vertical retrace signals at appropriate intervals to said video display and which blanks the raster scan during retrace;

third programmed means which assigns a priority to each of the processing devices;

fourth means which are used by each processing device to request system resources to access and display data;

fifth means which grants said resource requests;

sixth means coupled to said third means and responds to the priority assigned thereby for controlling said fifth means, which allocate said system resources among said processing devices in response to said priority assignment;

first terminating means connected to said sixth means which terminate a series of display memory accesses in response to an event signal;

second terminating means connected to said sixth means which terminates a series of display memory accesses in response to a programmed count of said accesses for the device performing them;

seventh means connected to both first and second terminating means for controlling whether said first terminating means or said second terminating means terminates a particular display memory access.

2. The circuit of claim 1 wherein said first terminating means responds to a signal which indicates that a process has reached a termination point.

3. The circuit of claim 1 wherein said first terminating means responds to a signal which indicates that a raster scan has reached the end of a scan line.

4. The circuit of claim 1 wherein said first terminating means responds to a signal which indicates that a memory output buffer is full.

5. The circuit of claim 1 wherein said second terminating means responds to the expiration of a count of said accesses.

* * * * *